United States Patent
Maier

(10) Patent No.: US 9,616,733 B2
(45) Date of Patent: Apr. 11, 2017

(54) SHADING DEVICE FOR A REAR WINDOW ARRANGEMENT OF A MOTOR VEHICLE

(71) Applicant: Matthias Maier, Esslingen (DE)

(72) Inventor: Matthias Maier, Esslingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/812,443

(22) Filed: Jul. 29, 2015

(65) Prior Publication Data
US 2016/0031297 A1 Feb. 4, 2016

(30) Foreign Application Priority Data
Aug. 1, 2014 (DE) .......................... 10 2014 215 154

(51) Int. Cl.
*B60J 3/02* (2006.01)
*B60J 1/20* (2006.01)

(52) U.S. Cl.
CPC ............. *B60J 3/0243* (2013.01); *B60J 1/208* (2013.01); *B60J 1/2027* (2013.01); *B60J 1/2044* (2013.01); *B60J 3/0226* (2013.01); *B60J 1/2052* (2013.01)

(58) Field of Classification Search
CPC ...... B60J 3/0243; B60J 3/0226; B60J 1/2027; B60J 1/208; B60J 1/2044; B60J 1/2052
(Continued)

(56) References Cited

U.S. PATENT DOCUMENTS 7,316,443 B2 * 1/2008 Schlecht ................ B60J 1/2027
160/370.22
7,396,067 B2 7/2008 Thumm et al.
(Continued)

FOREIGN PATENT DOCUMENTS

DE 34 15 930 A1 10/1985
DE 10 2006 017 883 A1 10/2007
(Continued)

OTHER PUBLICATIONS

Search Report of European Patent Office issued in Application No. EP 15 17 7898 with English translation of category of cited documents dated Dec. 16, 2015 (9 pages).
(Continued)

*Primary Examiner* — Joseph D Pape
*Assistant Examiner* — Dana Ivey
(74) *Attorney, Agent, or Firm* — Flynn, Thiel, Boutell & Tanis, P.C.

(57) ABSTRACT

A shading device for a rear window arrangement of a motor vehicle having a shading structure arranged so as to be shiftable relative to the rear window arrangement between a compactly stored inoperative position and an extended shading position, and with a dimensionally stable extension profile arranged on an end region, at the front in the extension direction, of the shading structure, the extension profile being guided so as to be shiftable in parallel in vehicle-mounted, lateral guide arrangements. The extension profile having two different visible contours positionable into different functional positions by rotation about a longitudinal axis of the extension profile, is known. The extension profile is mounted on opposite end sides by respective ball and socket joint so as to be pivotable about the longitudinal axis relative to lateral guide elements guided in the lateral guide arrangements.

11 Claims, 7 Drawing Sheets

(58) Field of Classification Search
USPC .......................................................... 296/97.4
See application file for complete search history.

(56) References Cited

U.S. PATENT DOCUMENTS

| | | | |
|---|---|---|---|
| 7,823,955 B2* | 11/2010 | Alacqua | B60J 3/0204 |
| | | | 160/370.22 |
| 8,308,217 B2* | 11/2012 | Patel | B60J 3/0208 |
| | | | 160/370.22 |
| 8,905,116 B2 | 12/2014 | Weinbrenner | |
| 2007/0095489 A1 | 5/2007 | Thumm et al. | |
| 2012/0285638 A1 | 11/2012 | Weinbrenner | |
| 2013/0168034 A1 | 7/2013 | Katada | |

FOREIGN PATENT DOCUMENTS

| | | |
|---|---|---|
| DE | 10 2007 058 262 A1 | 5/2009 |
| EP | 1 782 979 A2 | 5/2007 |
| EP | 2 522 535 A2 | 11/2012 |
| EP | 2 620 304 A1 | 7/2013 |
| JP | 2010-215137 A | 9/2010 |

OTHER PUBLICATIONS

Office Action of German Patent Office issued in Application No. 10 2014 215 154.6 dated Apr. 9, 2015 (5 pages).

* cited by examiner

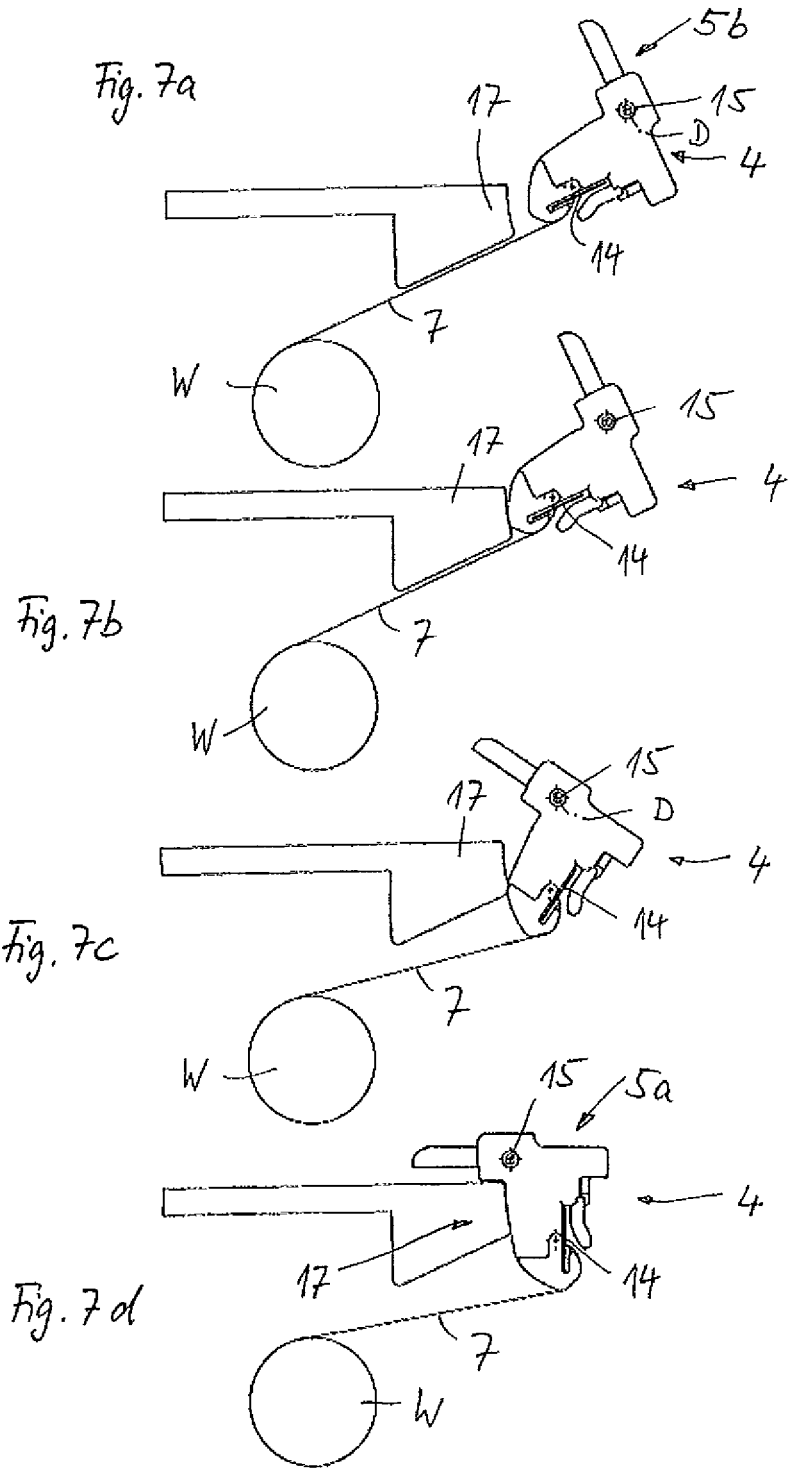

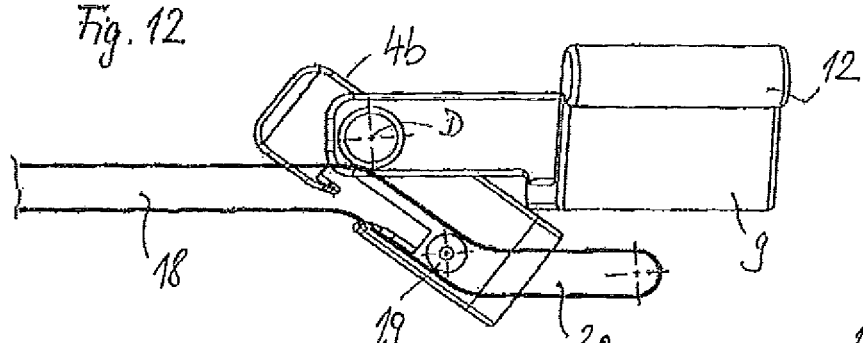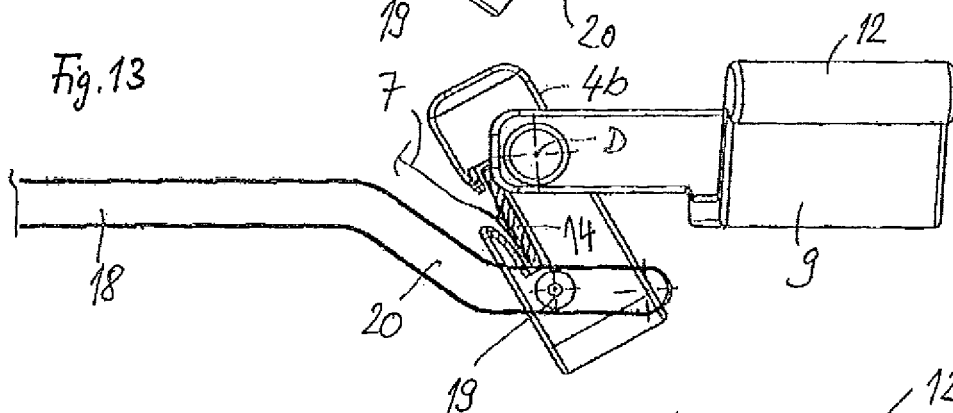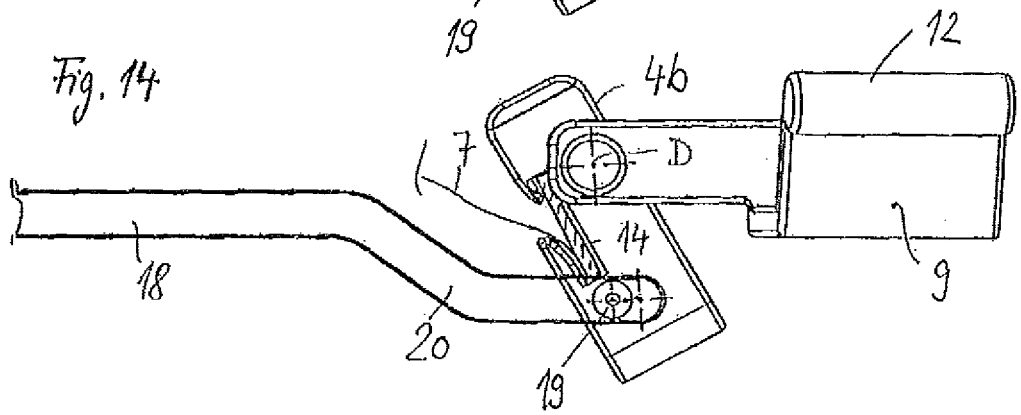

SHADING DEVICE FOR A REAR WINDOW ARRANGEMENT OF A MOTOR VEHICLE

CROSS-REFERENCE TO RELATED APPLICATIONS

This application claims priority from German patent application DE 10 2014 215 154.6, the disclosure of which is hereby incorporated by reference in its entirety into this application.

FIELD OF THE INVENTION

The invention relates to a shading device for a rear window arrangement of a motor vehicle, with a shading structure which is arranged so as to be shiftable relative to the rear window arrangement between a compactly stored inoperative position and an extended shading position, and with a dimensionally stable extension profile which is arranged on an end region, at the front in the extension direction, of the shading structure, the extension profile being guided so as to be shiftable in parallel in vehicle-mounted, lateral guide arrangements, the extension profile being assigned at least two different visible contours which can be brought into different functional positions by rotation about a longitudinal axis of the extension profile.

BACKGROUND OF THE INVENTION

A shading device of this type is known from EP 1 782 979 B1. The known shading device has a flexible shading structure which is held so as to be able to be wound and unwound on a winding shaft. The winding shaft is mounted rotatably below a rear parcel shelf of the vehicle interior. The rear parcel shelf is provided with a slot which extends in the transverse direction of the vehicle and through which the shading structure passes in order to be able to shade the rear window of the motor vehicle. At an end region which is at the front in the extension direction, the shading structure is provided with a dimensionally stable extension profile which is mounted in lateral guide arrangements arranged mounted on the vehicle. On the interior side, the lateral guide arrangements extend in the region of C pillars of the vehicle body and have a curved profile between the inoperative position of the shading structure and the extended shading position such that the extension profile pivots by approximately 90° about the longitudinal axis thereof over the course of said movement track. The extension profile is provided with two different visible contours, with one visible contour being produced in a flat orientation of the extension profile and the other visible contour being produced in a steep orientation of the extension profile. The visible contour of the extension profile that is effective in the steep orientation has a convex section of curvature which follows a roof lining contour. In the flat orientation, the visible contour of the extension profile conceals the passage slot in the rear parcel shelf.

SUMMARY OF THE INVENTION

It is the object of the invention to provide a shading device of the type mentioned at the beginning, which permits improved shading and covering functions.

This object is achieved in that the extension profile is mounted on opposite end sides by means of a respective hinge joint so as to be pivotable about the longitudinal axis relative to lateral guide elements which are guided in the lateral guide arrangements. By means of the pivotability of the extension profile about a longitudinal axis defined by the two hinge joints, particularly simple orientability of the extension profile with the different visible contours thereof results without depending on the configuration and curvature of the lateral guide arrangements. According to the invention, it is on the contrary even possible to orient the lateral guide arrangements rectilinearly over the entire extension path of the shading structure and accordingly to arrange same in a common plane. Advantageously, the hinge joints are ball and socket joints. In addition, non-parallel orientations of the lateral guide arrangements relative to each other are compensated for by the ball and socket joints, and therefore even a rear window of approximately trapezoidal configuration can be at least largely completely shaded. The solution according to the invention is suitable in a particularly advantageous manner for passenger vehicles which are provided with rear windows with a pronounced inclination. In an advantageous manner, the shading structure is positioned below a rear parcel shelf in the compactly stored inoperative position. The compact storage of the shading structure means that the shading structure is positioned folded up, collapsed or wound up in the inoperative position in order to require relatively little space. A winding shaft, on which the shading structure is held so as to be able to be wound up and unwound, is particularly advantageously mounted rotatably under the rear parcel shelf.

In a refinement of the invention, the shading structure acts on the extension profile eccentrically with respect to the longitudinal axis, about which the extension profile is pivotable. As a result, when the shading structure is extended from the inoperative position into the shading position, the shading structure permanently exerts a torque on the extension profile about the longitudinal axis thereof, since a restoring force which results in the taut tensioning of the shading structure acts on the shading structure. In a particularly advantageous manner, the restoring force is exerted within the winding shaft by a winding spring which brings about a tensile force on the shading structure in the winding-up direction.

In a further refinement of the invention, in the region of the inoperative position or of the shading position of the shading structure, the extension profile is assigned, mounted on the vehicle, a mechanical stop means which, when the shading structure is transferred into the inoperative position or into the shading position, forces rotation of the visible contours into the one or other functional position. As soon as the extension profile comes to bear against the vehicle-mounted stop means, the stop means brings about an inevitable rotation of the extension profile about the longitudinal axis thereof, as a result of which the extension profile is oriented into a different pivoting position than the position in which the extension profile is guided between the inoperative position and the shading position of the shading structure. The pivoting on account of the striking against the mechanical stop means takes place counter to the torque which exerts the eccentric action of the shading structure on the extension profile about the longitudinal axis of the extension profile. By means of the different orientations of the extension profile, the one or the other visible contour is effective, depending on the functional position, for corresponding covering or shading. The mechanical stop means is advantageously provided in the region of the inoperative position of the shading structure and serves to pivot the extension profile in such a manner that the latter covers a passage slot in a rear parcel shelf for the shading structure.

In a further refinement of the invention, the different visible contours are provided on the extension profile. Accordingly, depending on the orientation of the extension profile and viewing direction of vehicle occupants downward from the vehicle interior, the outer contours extending over the length of the extension profile form the different visible contours which can serve for covering a visible gap between a roof lining and the shading structure in the shading position of the shading structure and for covering a passage slot in the region of the rear parcel shelf in the inoperative position of the shading structure.

According to the invention, the different visible contours can also be provided, instead of on the extension profile, on a panel which is assigned to the extension profile and is pivotable relative to the extension profile. In this solution, the extension profile itself does not have to be pivotable about the longitudinal axis thereof. This is because the pivotability about a longitudinal axis of the extension profile, which pivotability is required for the different visible contours, takes place by means of the panel which is mounted on the extension profile so as to be pivotable about this longitudinal axis. The covering and shading functions of said panel are the same as in the embodiment in which the extension profile is pivotable.

In a further refinement of the invention, the lateral guide elements are formed by guide carriages which are movable along the lateral guide arrangements with the aid of driving members. Threaded shafts which are also referred to as flexible shafts and which form pressure-resistant drive transmission members are advantageously provided as the driving members.

In a further refinement of the invention, the extension profile is provided with a central profile and lateral telescopic sections which each have bearing pins on the end side coaxial with respect to the longitudinal axis of the extension profile, the bearing pins each engaging in the ball and socket joint. The desired pivotability of the longitudinal axis of the extension profile is obtained by means of the bearing pins.

In a further refinement of the invention, each bearing pin is secured axially in the associated ball and socket joint. It is thereby ensured that an axial connection is maintained between the opposite ball and socket joints in the guide carriages and the extension profile.

In a further refinement of the invention, the panel in an unloaded position is held in a first functional position by a spring arrangement, and when the shading structure is transferred into the shading position, the panel runs up against the mechanical stop means in such a manner that the panel is pivoted into a second functional position which is different from the first functional position. The different functional positions define the respective visible contours. The spring arrangement keeps the panel positioned in a defined manner in an unloaded position as long as the panel does not enter into contact with the mechanical stop means.

In a further refinement of the invention, a visible contour of the extension profile or of the panel is adapted to a roof lining contour of a vehicle interior, in particular as configured as a convex contour curvature. As a result, a visible gap remaining between an end edge of the shading structure and a roof lining contour is largely concealed by the visible contour of the extension profile in the corresponding functional position.

In a further refinement of the invention, a stop cam arranged in the region of the respective lateral guide arrangement is provided in each case as a mechanical stop means. The two stop cams on the opposite lateral guide arrangements are advantageously configured identically to each other and are oriented identically to each other in order to obtain a synchronous pivoting of the extension profile or of the panel as soon as the extension profile or the panel strikes against the two stop cams.

In a further refinement of the invention, the lateral guide arrangements are assigned positive guide means which cause, in the region of at least one functional position, an inevitable pivoting of the extension profile or the panel. The positive guide means can be integrated in lateral guide rail systems which constitute the lateral guide arrangements.

In a further refinement of the invention, the positive guide means have one respective positive movement guide extending along each lateral guide arrangement and one respective positive guiding pin which is guided in the positive movement guide and spaced from the longitudinal axis, which pin is guided in the corresponding positive movement guide. The positive movement guide preferably extends at a distance from the respective lateral guide arrangement. The positive guiding pin is mounted in the positive movement guide for sliding or rolling movement. As a result, the positive guiding pin is configured as a type of slider or a type of track roller.

In a further refinement of the invention, each positive movement guide constitutes a curved sector in the region of the functional position, the sector being configured such that the positive guiding pin, in the region of the curved sector, causes pivoting of the extension profile or the panel. The curved sector is preferably S-shaped, with the curved sector advantageously being configured such that, toward the end face thereof, which corresponds to a respective end position of the extrusion profile or the panel, the curved sector is at a farther distance from the respective lateral guide arrangement than in a region which is positioned at a distance upstream of the end-sided functional position.

Further advantages and features of the invention emerge from the claims and from the description below of preferred exemplary embodiments of the invention, which are illustrated with reference to the drawings.

BRIEF DESCRIPTION OF THE DRAWINGS

FIGS. 11 to 14 show illustrations according to FIG. 10 in different intermediate positions in the direction towards the end-sided functional position of the shading device.

DETAILED DESCRIPTION

Figure 1:
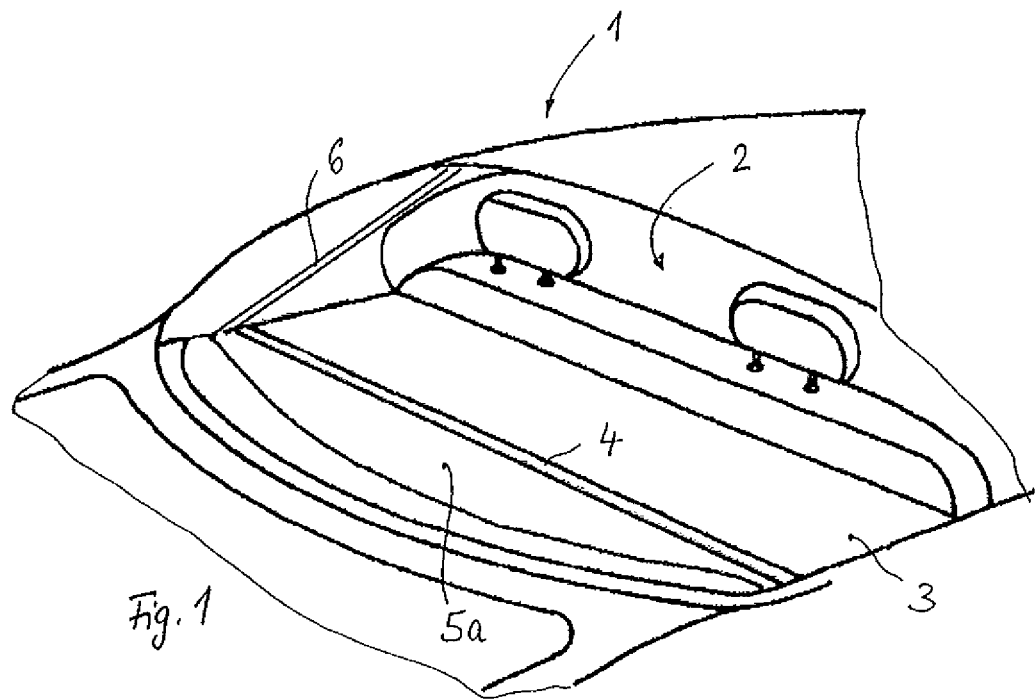
FIG. 1 shows schematically, in a perspective illustration, part of a passenger vehicle in the region of a vehicle rear window in which an embodiment of a shading device according to the invention is provided.
Figure 2:
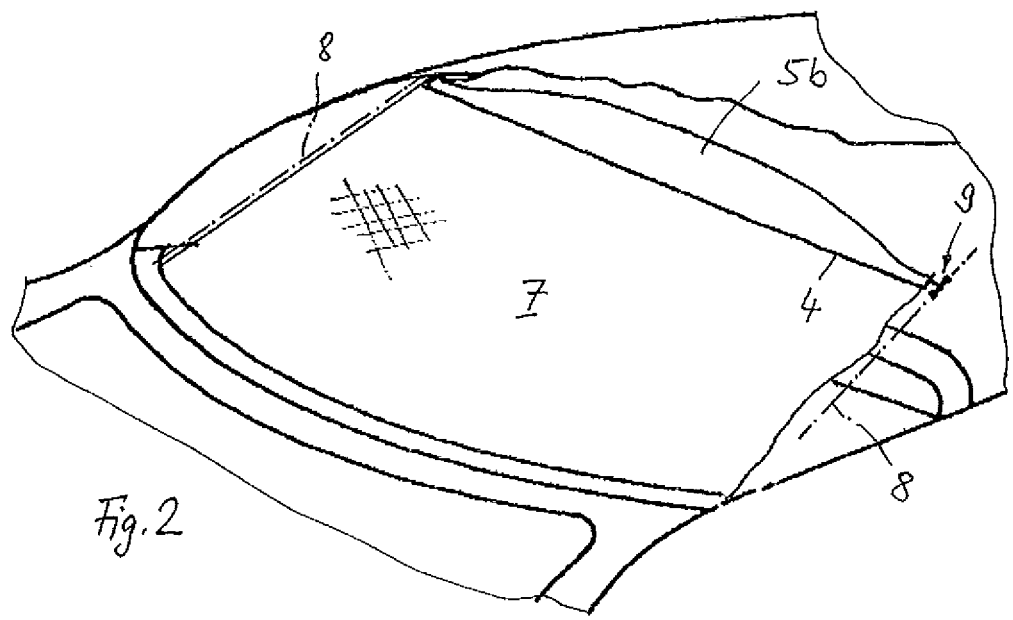
FIG. 2 shows the illustration according to FIG. 1 with the shading device transferred into the shading position thereof.

A passenger vehicle 1 according to FIGS. 1 and 2 has a rear window arrangement 2 which bounds a vehicle interior of the passenger vehicle 1 on the rear side. In the vehicle interior, an approximately horizontally oriented rear parcel shelf 3 which is positioned mounted on the vehicle behind a backrest arrangement of a rear seat bench is provided below the rear window arrangement 2.

Figure 5:
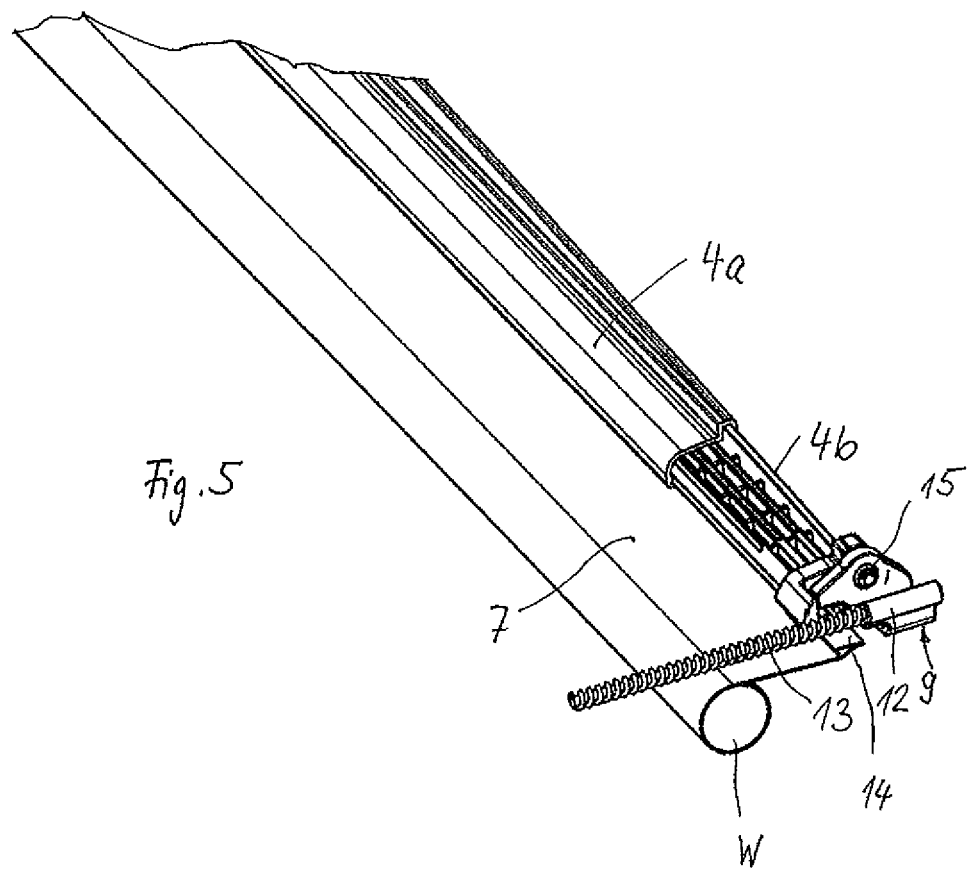
FIG. 5 shows, in a further perspective illustration, the shading device according to FIGS. 1 to 4.
Figure 6:
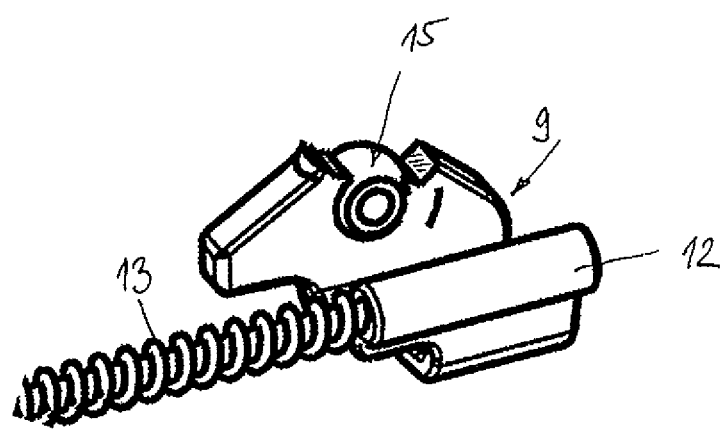
FIG. 6 shows, in an enlarged, partially cut open illustration, a guide carriage of the shading device according to FIG. 5, FIGS. 7a to 7d show schematically, in a side view, various functional positions of the shading device according to FIGS. 1 to 6, FIGS. 8a and 8b show a further embodiment of a shading device according to the invention similar to FIGS. 7a to 7d.

In order to be able to shade the rear window arrangement 2, a shading device which comprises a flexible shading structure 7, in particular in the form of textile netted or woven fabric, is provided. As can be seen with reference to FIGS. 5 to 7d, the shading structure 7 is held so as to be able to be wound up on and unwound from a winding shaft W. The winding shaft W is mounted rotatably on the vehicle below the rear parcel shelf 3 with an axis of rotation extending in the transverse direction of the vehicle. The shading structure 7 is shiftable between an inoperative position in which it is wound up on the winding shaft W (FIGS. 1, 5 and 7d), and a shading position which is illustrated with reference to FIG. 2 and in which the shading structure 7 is stretched open in the vehicle interior in such a manner that the rear window arrangement 2 is at least virtually completely covered, as seen from the vehicle interior. At an end region which is at the front in the extension direction, the shading structure 7 is fastened to an extension profile 4 which extends in the transverse direction of the vehicle and, at the opposite ends thereof, is shiftable in parallel between the inoperative position of the shading structure 7 and the shading position of the shading structure 7 by means of a respective guide carriage 9 in vehicle-mounted, lateral guide arrangements 8. The lateral guide arrangements 8 are arranged in the region of C pillar sections of the vehicle body, wherein said guide arrangements are preferably provided in the region of corresponding interior trim parts. The two mutually opposite lateral guide arrangements 8 each define a rectilinear guide track, and therefore said guide tracks are arranged in a common plane. Said plane is identical to the stretching-out plane of the shading structure 7.

In the inoperative position of the shading structure 7, in which the latter rests on a passage slot in the region of the rear parcel shelf 3, the extension profile 4 has a first flat visible contour 5a. In the shading position of the shading structure 7, the extension profile 4 is shifted upward in relation to the inoperative position toward a roof lining and is rotated in such a manner that the extension profile 4 forms a second visible contour 5b different from the first visible contour. In this position, a remaining visible gap between a roof lining contour and the shading structure is at least virtually completely concealed by the position of the extension profile 4. For this purpose, the extension profile 4 is configured in the manner of a plate and has a substantially convex outer contouring extending over the length of the extension profile 4.

The shading structure 7 has a substantially rectangular surface. The two lateral guide arrangements 8 each form a rectilinear guide slot 6 on opposite sides of the region of the corresponding interior trim parts of the C pillar sections. The two lateral guide arrangements 8 are not oriented parallel to each other, but on the contrary run, starting from the lower inoperative position of the shading structure 7, in the manner of trapezoidal limbs toward each other in the direction of the roof lining in a manner symmetrical with respect to a vertical central longitudinal plane of the passenger vehicle 1.

In order to be able to shift the shading structure 7 between the inoperative position and the shading position, the extension profile 4 is assigned, on opposite end sides, two guide carriages 9 which are movable longitudinally in the lateral guide arrangements 8. Each guide carriage 9 is assigned a driving means in the form of a flexible shaft 13 which forms a pressure-resistant drive transmission train. The flexible shafts are guided in a linearly movable manner (not illustrated specifically) in corresponding guide channels of the receiving housing sections 10 of the lateral guide arrangements 8 by means of a gear wheel mechanism and a centrally arranged electric motor. Each flexible shaft 13 engages in the region of the associated guide carriage 9 (see FIGS. 3 to 6) on a guide block 12 of the respective guide carriage 9. The guide block 12 is guided in a longitudinally displaceable manner in the corresponding guide channel of the guide housing sections 10 of the respective lateral guide arrangement 8.

Since the lateral guide arrangements 8 are not oriented parallel to each other, the length of the extension profile 4 over the extension path of the shading structure 7 inevitably has to change in order to be able to obtain a uniform lateral guidance in the guide arrangements 8. For this purpose, the extension profile 4 is provided with a central part 4a and two side parts 4b which are arranged in a telescopically displaceable manner in the central part 4a.

The shading structure 7 is fastened to the extension profile 4 with the aid of an end strip 14 which extends over the width of the shading structure 7 and is stiffer than the shading structure 7. The end strip 14, which is also referred to as a transverse guiding strip, forms a piping which is retracted transversely into a corresponding slot receptacle (not referred to specifically) of the extension profile 4 and thus fixes the shading structure 7 over the entire width thereof to the extension profile 4.

Figure 3:
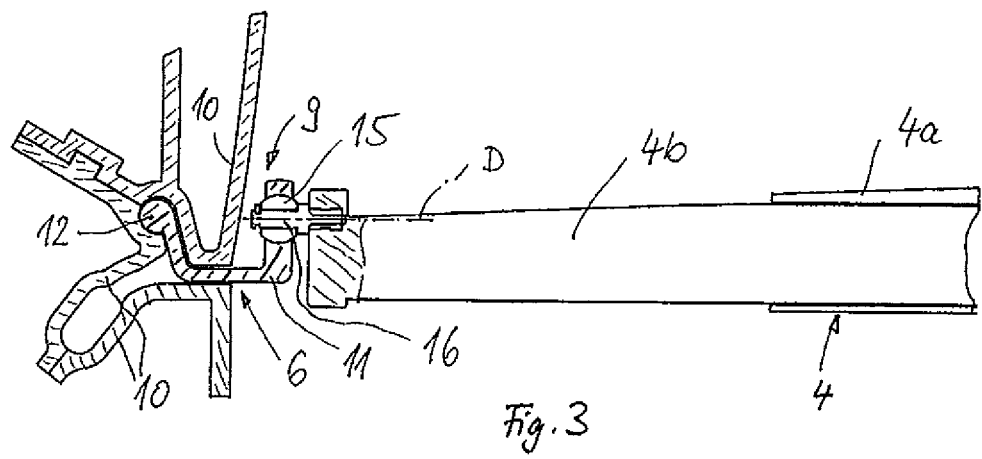
FIG. 3 shows, in an enlarged, schematic sectional illustration, a partial region of the shading device according to FIGS. 1 and 2.
Figure 4:
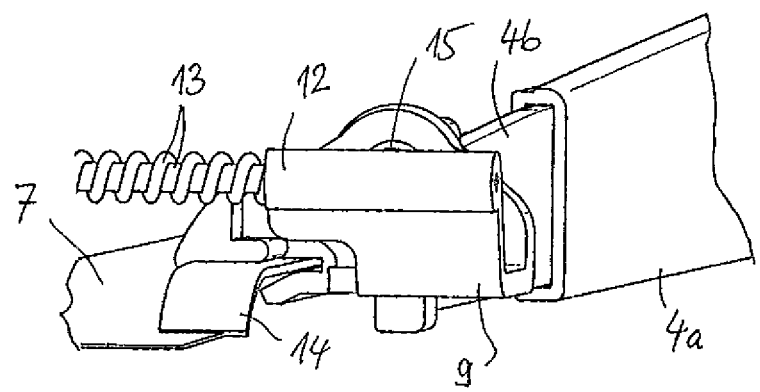
FIG. 4 shows, in a perspective illustration, the partial region of the shading device according to FIG. 3.

The extension profile 4 is mounted on the lateral guide carriages 9 so as to be rotatable about an axis of rotation D. The axis of rotation D extends in the longitudinal direction of the extension profile 4, above an imaginary central longitudinal axis of the extension profile 4 according to FIG. 3. For the mounting of the extension profile 4 on the end sides, the extension profile 4 is provided on the opposite ends thereof with a respective bearing pin 16 which protrudes laterally on the end side coaxially with respect to the axis of rotation D (FIG. 3). The bearing pin 16 is mounted rotatably in a ball and socket joint 15 which is mounted in the guide carriage 9. The two ball and socket joints 15 on opposite sides of the extension profile 4 ensure that the extension profile 4 can pivot about the axis of rotation D despite the lateral guide arrangements 8, in which the two guide carriages 9 are guided, not being oriented parallel. The ball and socket joints 15 are integrated in support sections 11 of the guide carriages 9. As can be seen with reference to FIG. 3, the bearing pins 16 are provided on the telescopic sections 4b of the extension profile 4.

It can be seen with reference to FIGS. 4, 5 and 7a to 7d that the end strip 14 of the shading structure 7 is held in the receiving slot of the extension profile 4 at a distance from the axis of rotation D. The winding shaft W is subjected to a torque in the winding-up direction by means of a restoring spring arrangement (not illustrated specifically) such that the shading structure 7 is oriented between the extension profile 4 and the winding shaft W so as always to be tensioned. The corresponding restoring force of the restoring spring arrangement accordingly causes a permanent torque on the extension profile 4 about the axis of rotation D, coaxially with respect to which axis the extension profile 4 is mounted in the lateral guide carriages 9. As a result, during a shifting operation, the extension profile 4 is inevitably oriented by means of the flexible shafts 13 in an upright position, as can be seen with reference to FIGS. 7*a* and 7*b*. In this orientation, the visible contour 5*b*, in which the plate-like section of the extension profile 4 is directed vertically upward, is effective (see FIG. 2).

Shortly before the inoperative position of the shading structure 7 is reached, the extension profile 4 comes to bear against a mechanical stop means in the form of at least one stop cam 17 which is provided above the movement track of the shading structure 7. As a result, the extension profile 4 according to FIGS. 7*b* to 7*d* is inevitably pivoted in the counter clockwise direction such that the extension profile 4 lies flat after the inoperative position (FIG. 7*d*) is reached, i.e. is positioned so as to be oriented with a flat visible contour 5*a*. The at least one stop cam 17 is preferably provided in the region of the passage slot of the rear parcel shelf 3 such that the extension profile 4 in a flat orientation with the visible contour 5*a* conceals the passage slot. In order to facilitate the inevitable pivoting of the extension profile 4, the extension profile 4 is provided with a run-on contour (not denoted specifically) which, on striking against the at least one stop cam 17, interacts with the complementary contour of the stop cam 17 and achieves sliding along and into the intended pivoting position.

Figure 8A:
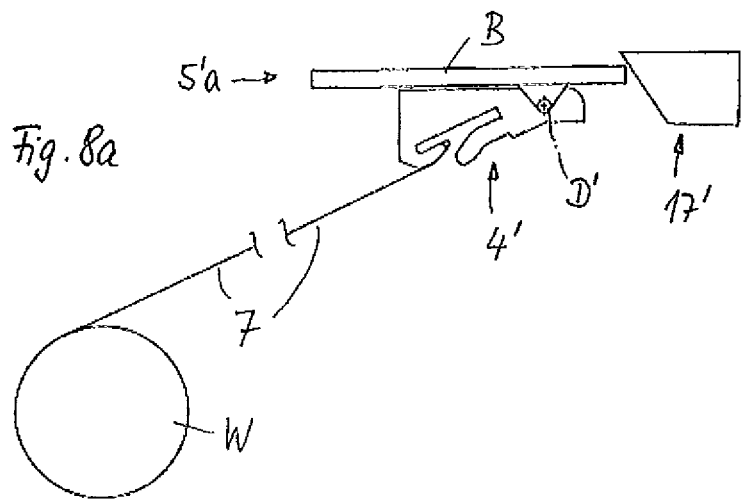
Figure 8B:
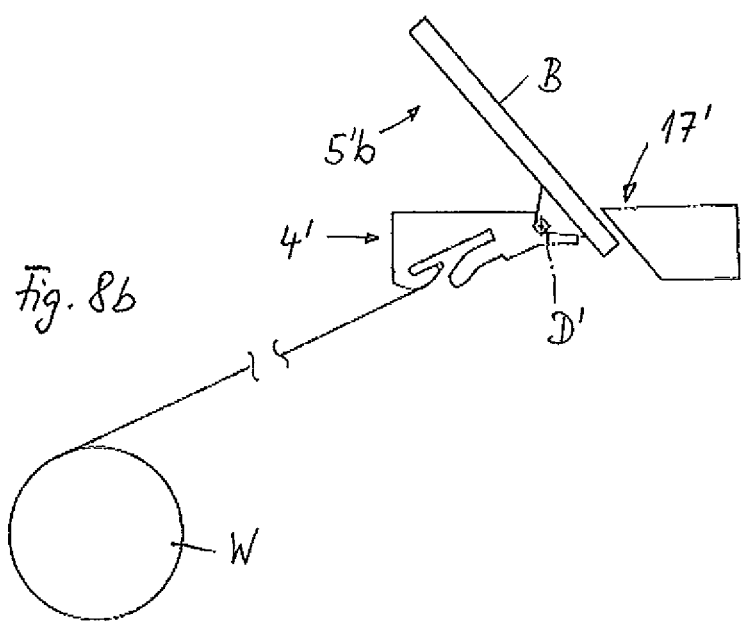
Figure 9:
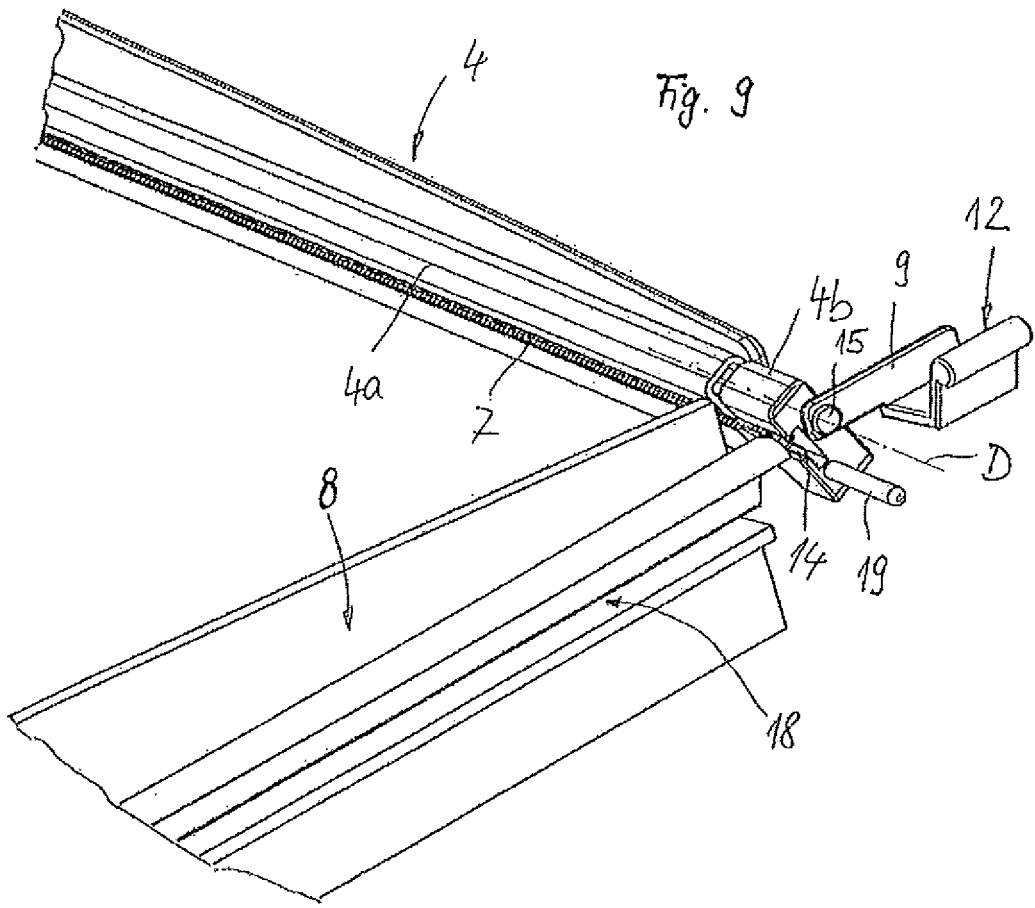
FIG. 9 shows another embodiment of a shading device according to the invention in a sectional, perspective illustration.

In the embodiment according to FIGS. 8*a* and 8*b*, the shading device is basically arranged and constructed in the same manner as has already been described in detail with reference to the embodiment according to FIGS. 1 to 7*d*. In order to avoid repetitions, reference is therefore made to the disclosure with respect to the embodiment according to FIGS. 1 to 7*d*. Identical parts or sections of the shading device are provided with the same reference numbers. Functionally identical parts or sections are likewise provided with the same reference numbers or letters, but with the addition of a "'". In the embodiment according to FIGS. 8*a* and 8*b*, the shading structure 7 is held on an extension profile 4' which is not arranged rotatably on lateral guide carriages, but rather in a fixed manner. However, the extension profile 4' is assigned a panel B which has a convex plate contouring similar to the contouring of the extension profile 4 according to FIG. 2. The panel B is held on the extension profile 4' so as to be pivotable about an axis of rotation D' extending in the longitudinal direction of the extension profile 4'. The panel B can be held by a spring arrangement (not illustrated specifically) in the inoperative position thereof, in which the panel according to FIG. 8*a* rests flat on an upper side of the extension profile 4'. The spring arrangement also ensures that the panel B rests on the extension profile 4' without rattling. The spring arrangement can be effective between panel B and extension profile 4' as a leg spring in the region of at least one bearing point of the panel B level with the axis of rotation D'. The panel B has a lever extension (not denoted specifically) which protrudes forward in the extension direction of the extension profile 4'. In the region of the shading position for the shading structure 7, at least one mechanical stop means 17' is provided mounted on the vehicle, said stop means erecting the panel B upward when the shading position of the extension profile 4' is reached, as can be seen with reference to FIG. 8*b*. The panel B is inevitably erected by the lever extension of the panel B striking against the mechanical stop means 17', which is configured as a stop cam. As a result, the panel B defines the visible contour 5'*b*, which is oriented vertically, as soon as the panel B is pivoted upward by the stop means 17'. By means of the spring arrangement, the panel B is inevitably pivoted back again into the position of the flat visible contour 5'*a* (FIG. 8*a*) as soon as the extension profile 4' leaves the shading position again and is lowered obliquely downward.

The bearing pin 16 is held relative to the ball and socket joint 15 in a manner secured axially by means of an axial securing ring (not denoted specifically).

The shading device according to FIGS. 9 to 14 corresponds essentially to the embodiment described above with reference to FIGS. 1 to 6 and 7*a* to 7*d*. In order to avoid repetitions, as to structurally and functionally identical parts and sections reference is therefore made to the description of embodiments according to FIGS. 1 to 7*d*. Functionally or structurally identical parts and sections are provided with identical reference numerals. Differences of the shading device according to FIGS. 9 to 14 are discussed below.

The extension profile 4 of the shading device according to FIGS. 9 to 14 has a central part 4*a* and two lateral parts 4*b*, each guided in a lateral guide arrangement 8. For that purpose, the lateral parts 4*b* are mounted rotatably about an axis of rotation D on a respective guide carriage 9. Mounting the extension profile 4 on the respective guide carriage 9 is in each case by means of a hinge joint 15. In the embodiment according to FIGS. 9 to 14, the opposite lateral guide arrangements 8 are aligned parallel to one another, so that the hinge joints 15 can be configured as simple hinge joints, and not as ball and socket joints. In a not illustrated embodiment, the lateral guide arrangements 8 are disposed non-parallel to one another, and the hinge joints 15 have a ball and socket joint design. For the rest, said not illustrated embodiment does not differ from the embodiment according to FIGS. 9 to 14.

Each guide carriage 9 is driven by means of a respective guide block 12 via a thread shaft (not illustrated), which shaft is also designed as a flexible shaft and constitutes a drive transmission train that is rigid in compression.

Each lateral guide arrangement 8 is assigned a positive guide track 18 at a distance below a corresponding guide channel, in which the guide carriage 9 and the guide block 12 are guided, which track passes into a positive movement guide 20 in the direction of an erected end position of the extension profile 4. The positive movement guide 20 is an S-shaped curved sector with the end face region (FIG. 10) thereof being oriented parallel to the positive guide track 18, but at a greater distance relative to the guide channel of the lateral guide arrangement 8.

Figure 10:
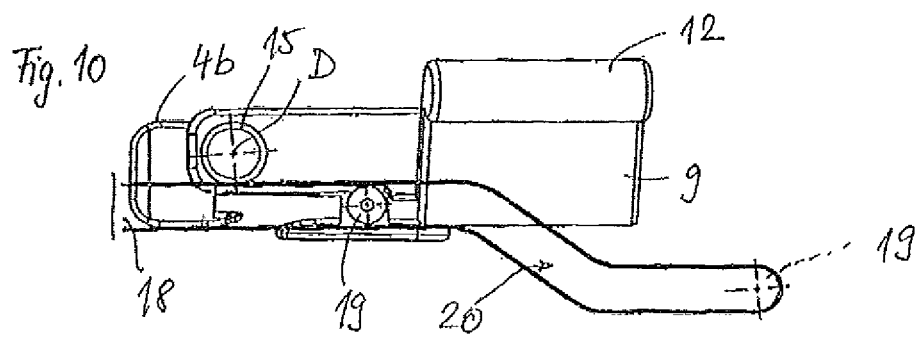
FIG. 10 shows schematically, in a side view, the shading device according to FIG. 9 shortly before reaching an end-sided functional position.
Figure 11:
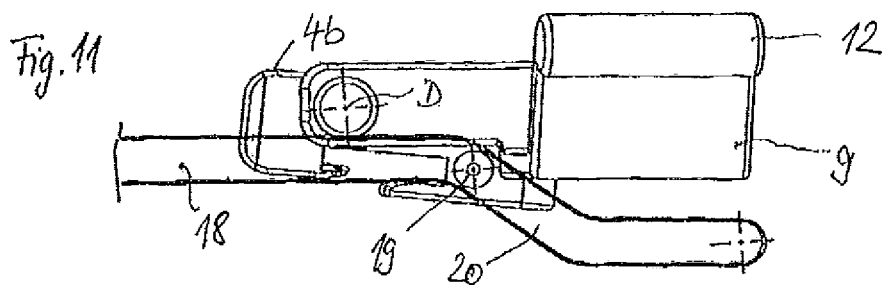

In the positive guide track 18 and the positive movement guide 20 a positive guide pin 19 is mounted for sliding movement and protrudes laterally outwards from an end face of the lateral part 4*b* parallel to the axis of rotation D. An end position of the positive guide pin 19 on the face end region of the positive movement guide 20 is shown in FIG. 10.

Also shown in FIGS. 10 to 14 is that the positive guide pin 19 is arranged on the lateral part 4*b* eccentrically offset in relation to the hinge joint 15, so that the extension profile 4 in the region towards the positive guide track 18 is guided in parallel relative to the lateral guide arrangement 8, as long as the positive guide pin 19 has not yet reached the curved positive movement guide 20. Once the guide block 12 and the guide carriage 9 are displaced further toward the direction of an end-sided functional position of the extension profile 4, the positive guide pin 19 inevitably slides into the downwards curved slant of the positive movement guide 20, whereby the extension profile 4 is inevitably pivoted. As a result, the extension profile 4 is inevitably set up, as is revealed with reference to FIGS. 12 to 14. Once the positive guide pin 19 has reached its end position in the positive movement guide 20, the extension profile 4 is completely set up into its end-sided functional position. With a corresponding return of the extension profile 4 in the opposite direction, there is inevitably a reverse sequence of movements starting from FIG. 14 towards FIG. 10.

The invention claimed is:

1. A shading device for a rear window arrangement of a motor vehicle, including a shading structure arranged so as to be shiftable relative to the rear window arrangement between a compactly stored inoperative position and an extended shading position, and a substantially rigid extension profile arranged on an end region of the shading structure, the extension profile being guided so as to be shiftable in vehicle-mounted, lateral guide arrangements, the extension profile being assigned at least two different visible contours which can be brought into different functional positions by rotation about a longitudinal axis of the extension profile, the extension profile being mounted on opposite ends by respective ball and socket hinge joints so as to be pivotable about the longitudinal axis relative to lateral guide elements which are guided in the lateral guide arrangements, the extension profile having a central profile and lateral telescopic sections each having a bearing pin oriented coaxially with the longitudinal axis of the extension profile, each bearing pin engaging in one of the ball and socket joints.

2. The shading device as claimed in claim 1, wherein the shading structure acts on the extension profile eccentrically with respect to the longitudinal axis about which the extension profile is pivotable.

3. The shading device as claimed in claim 1, further including a mechanical stop arrangement, the mechanical stop arrangement being disposed and configured such that when the shading structure is transferred into the inoperative position or into the shading position, the mechanical stop arrangement forces rotation of the visible contours into a selected one of the functional positions.

4. The shading device as claimed in claim 3, wherein the visible contours are provided on the extension profile.

5. The shading device as claimed in claim 1, wherein the mechanical stop arrangement includes a stop cam arranged in a region of each lateral guide arrangement.

6. The shading device as claimed in claim 1, wherein the lateral guide elements are formed by guide carriages respectively movable along the lateral guide arrangements with the aid of driving members.

7. The shading device as claimed in claim 6, further including positive guide arrangements disposed adjacent the respective lateral guide arrangements and causing pivoting of the extension profile.

8. The shading device as claimed in claim 7, wherein each positive guide arrangement has a positive movement guide extending along the corresponding lateral guide arrangement and a positive guiding pin is guided in the corresponding positive movement guide and spaced from the longitudinal axis.

9. The shading device as claimed in claim 8, wherein each positive movement guide comprises a curved sector and movement of the positive guiding pin within the curved sector causes pivoting of the extension profile.

10. The shading device as claimed in claim 1, wherein each bearing pin is secured axially in the corresponding ball and socket joint.

11. The shading device as claimed in claim 1, wherein one of the visible contours of the extension profile is adapted to a roof lining contour of a vehicle interior and is configured to have a convex curvature.

* * * * *